Patented Jan. 21, 1930

1,744,469

UNITED STATES PATENT OFFICE

LEON J. D. HEALY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

ELECTROPAINT

No Drawing.     Application filed June 27, 1925. Serial No. 40,104.

My invention relates to protective paints and more particularly to a paint for use in the electroplating and allied arts.

In the electroplating process it is customary to suspend the article, or articles, to be plated in the electrolyte by means of racks or hooks and unless such racks or other supporting means, which are usually of metal, are protected in some manner they are themselves plated. The same is true of the cages or tumbling barrels in which small articles are plated. It is also desired under certain circumstances to prevent deposition on portions of the articles themselves.

One great weakness of the paints previously used for this purpose has been that they are not completely impervious to water, acids and alkalies and do not adhere firmly to the parts to which they are applied, permitting the solution to work in between the coating and the metal. The coating becomes rough and spongy and holds considerable quantities of plating solutions and transfers them from one tank to another thus poisoning the very costly solutions and preventing proper deposition.

It is among the objects of my invention to provide a paint which will withstand both acids and alkalies in the electroplating solutions, be able to withstand boiling solutions, and further, be water-proof, an absolute insulator, thus preventing loss of current and which shall adhere so firmly to the metal that no plating solution can work in between the paint and metal.

Another object is to provide a paint which may be quickly and easily applied without special apparatus.

Other and further objects will be apparent from the following specification and claim.

The paint of my invention is preferably made by compounding rubber with inert reinforcing ingredients which are acid and alkali resisting and also highly resistent to heat, thus furnishing protection against acid and alkali solutions at boiling temperatures. For this purpose I prefer to use asbestos, clays and/or infusorial earths. I also prefer to include a small amount of glue in the mixture as it aids in the dispersion of other ingredients and gives a certain desired firmness to the paint. The glue however is not absolutely essential. After masticating the above ingredients with the rubber, the latter preferably being smoked sheet or first latex or both, the mixture is brought into solution by the addition of suitable solvents such as petroleum, naphtha, gasoline, benzol or carbontetrachloride. It is then churned to a paint consistency. The paint may, if desired be colored by the addition of pigments.

The amount of the various ingredients may be varied depending on the quality and character of the materials selected, and without limiting my invention thereto I give the following formula as an example of one embodiment of my invention:

17 lbs. smoked sheet.
10 lbs. glue.
12 lbs. asbestos—finely divided and purified.
8 gals. carbon tetrachloride.
3 gals. benzole.
3 gals. 65° gasoline.

In use the paint is applied either by dipping, spraying or brushing the parts which it is desired to protect and insulate. One or more coats may be applied depending on the conditions of use but for general purposes I find that excellent results are obtained by applying a first coat, air curing, for about one half hour, applying a second coat and air curing for substantially an hour. I also find that in certain cases it is advantageous to further harden the paint after air curing by means of acid chloride of sulphur.

I claim:

A paint of the character described comprising a mixture of uncured rubber, finely divided asbestos and glue, in approximately equal proportions, and a rubber solvent.

In testimony whereof I have signed my name to the above specification.

LEON J. D. HEALY.